United States Patent
Beer et al.

(10) Patent No.: US 7,389,683 B2
(45) Date of Patent: Jun. 24, 2008

(54) METHOD AND DEVICE FOR DETECTING A COMBUSTION MISFIRE

(75) Inventors: Johannes Beer, Regensburg (DE); Josef Kainz, Salching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/541,416

(22) Filed: Sep. 29, 2006

(65) Prior Publication Data

US 2007/0078587 A1    Apr. 5, 2007

(30) Foreign Application Priority Data

Sep. 30, 2005    (DE) .................. 102005046953.1

(51) Int. Cl.
*G01M 15/00* (2006.01)

(52) U.S. Cl. ..................... 73/117.3

(58) Field of Classification Search ............. 73/116, 73/117.2, 117.3, 118.1
See application file for complete search history.

(56) References Cited

U.S. PATENT DOCUMENTS 4,986,232 A * 1/1991 Richter et al. ............ 123/676
6,584,834 B1 * 7/2003 Lehner et al. ............. 73/116
7,280,906 B2 * 10/2007 Schneider et al. .......... 701/109
2005/0145233 A1 * 7/2005 Schneider et al. .......... 123/690
2006/0230821 A1 * 10/2006 Taglialatela-Scafati et al. ...................... 73/117.3

FOREIGN PATENT DOCUMENTS

DE    199 13 746 C2    9/2000

* cited by examiner

*Primary Examiner*—Eric S. McCall

(57) ABSTRACT

An internal combustion engine has a plurality of cylinders that have been allocated in at least two groups to one exhaust gas tract each. In each exhaust gas tract, an exhaust gas catalytic converter and an exhaust gas probe are fitted upstream of the exhaust gas catalytic converter. In order to detect combustion misfires in a combustion chamber of one of the cylinders, the following steps are carried out in each case. A combustion misfire is detected in one of the cylinders and allocated to one of the groups of the cylinders depending on at least one operating variable of the internal combustion engine.

18 Claims, 7 Drawing Sheets

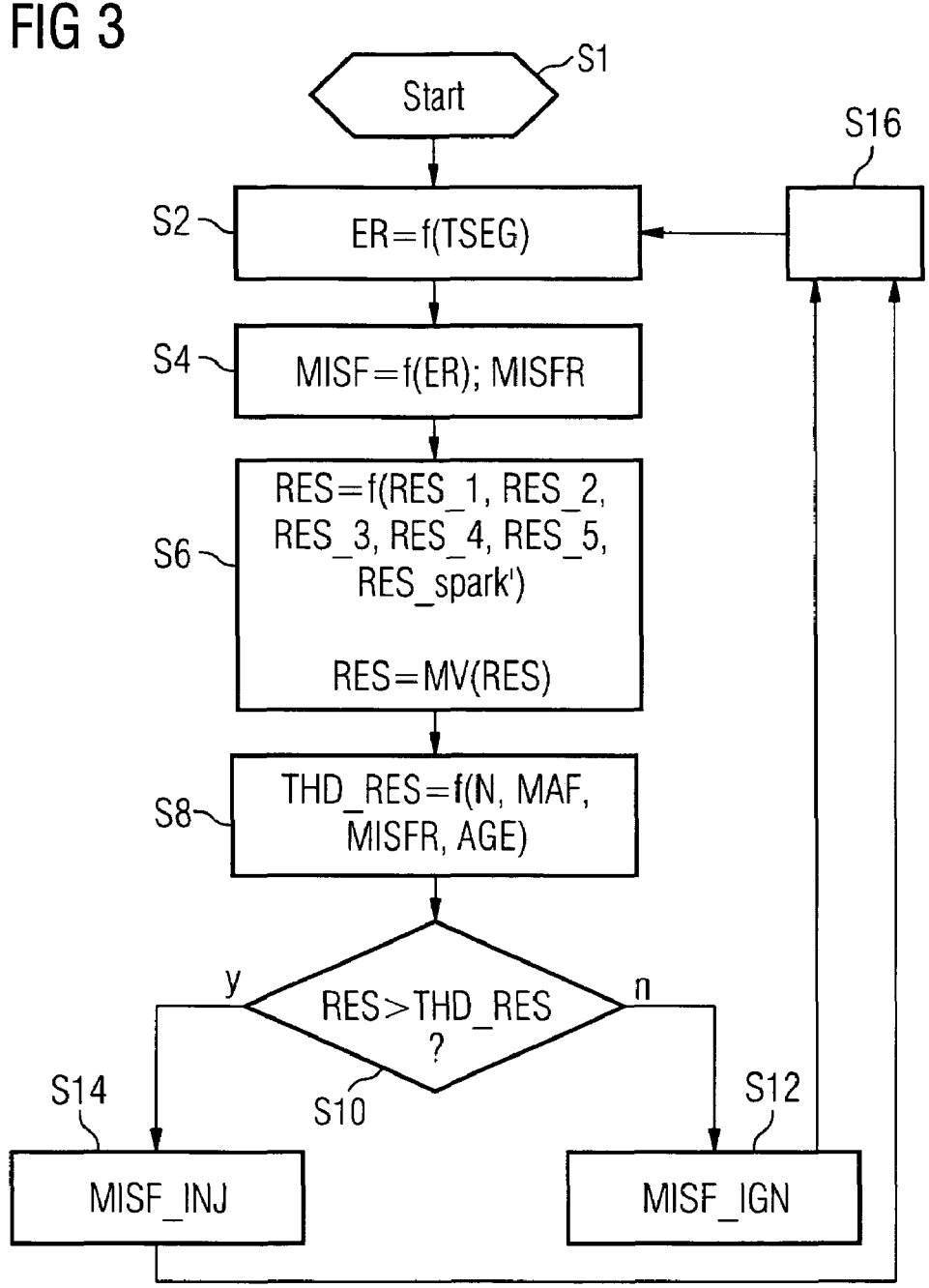

FIG 4

$$LAMB\_DIF\_RES_j(t_{k_{MAX}}) =$$
$$MAX\{(LAMB\_LS\_UP_j(t_k) - LAMB\_SP\_FIL\_HOM_j(t_k)) | t_k \in [t_{mis}, t_{mis} + \Delta t]\} \quad [F1]$$

$$LAMB\_DIF\_RES_{i \neq j}(t_{k_{MAX}}) =$$
$$LAMB\_LS\_UP_{i \neq j}(t_{k_{MAX}}) - LAMB\_SP\_FIL\_HOM_{i \neq j}(t_{k_{MAX}}) \quad [F2]$$

$$TI\_LAM\_COR\_RES_j(t_{k_{MAX}}) = \frac{1}{N+1} \sum_{k=k_{MAX}-N}^{k_{MAX}} TI\_LAM\_COR_j(t_k) \quad [F3]$$

$$TI\_LAM\_COR\_RES_{i \neq j}(t_{k_{MAX}}) = \frac{1}{N+1} \sum_{k=k_{MAX}-N}^{k_{MAX}} TI\_LAM\_COR_i(t_k) \quad [F4]$$

$$RES\_1 = LAMB\_DIF\_RES_j(t_{k_{MAX}}) - LAMB\_DIF\_RES_{i \neq j}(t_{k_{MAX}}) +$$
$$C1 \cdot [TI\_LAM\_COR\_RES_j(t_{mis}) - TI\_LAM\_COR\_RES_{i \neq j}(t_{mis})] \quad [F6]$$

FIG 5

$$LAMB\_DELTA\_LAM\_ADJ\_RES_j(t_{k_{MAX}}) = $$
$$\frac{1}{N+1} \sum_{k=k_{MAX}-N}^{k_{MAX}} LAMB\_DELTA\_LAM\_ADJ_j(t_k) \quad [F10]$$

$$LAMB\_DELTA\_LAM\_ADJ\_RES_{i \neq j}(t_{k_{MAX}}) = $$
$$\frac{1}{N+1} \sum_{k=k_{MAX}-N}^{k_{MAX}} LAMB\_DELTA\_LAM\_ADJ_{i \neq j}(t_k) \quad [F11]$$

$$RES\_2 = $$
$$\left[ \left( LAMB\_DELTA\_LAM\_ADJ\_RES_j(t_{k_{MAX}} + \Delta t_{OSC}) - \right. \right.$$
$$\left. \left. - LAMB\_DELTA\_LAM\_ADJ\_RES_{i \neq j}(t_{k_{MAX}} + \Delta t_{OSC}) \right) \right] \quad [F12]$$

FIG 6

$$RES\_3 = \left\{ \left[ MAX\left(0, \left(1 - LAMB\_SP\_FIL\_HOM_j\left(t_{k_{MAX}}\right)\right)\right)\right] \right\} \quad [F13]$$

FIG 10

$$RES\_5 = \quad [F23]$$
$$\left[ \left( LAMB\_LS\_DOWN_j(t_{k_{MAX}} + \Delta t_{OSC}) - \right. \right.$$
$$\left. \left. - LAMB\_LS\_DOWN_{i \neq j}(t_{k_{MAX}} + \Delta t_{OSC}) \right) \right]$$

FIG 7

$$ER\_CYL\_mmv_i(t_{k_{calc}}) = \frac{1}{N} \sum_{k=k_{calc}-N+1}^{k_{calc}} ER\_CYL_i(t_k) \qquad [F16]$$

$$RES\_ER\_i(t_{k_{calc}}) = \frac{ER\_CYL\_mmv_i(t_{k_{calc}}) - \frac{1}{M-1}\sum_{j=1;j\neq i}^{M} ER\_CYL\_mmv_j(t_{k_{calc}})}{THD\_ER(t_{k_{calc}}) - \frac{1}{M-1}\sum_{j=1;j\neq i}^{M} ER\_CYL\_mmv_j(t_{k_{calc}})} \qquad [F17]$$

$$F\_ER = \frac{C\_ER}{MISFR} \qquad [F18]$$

$$RES\_4 = F\_ER * RES\_ER\_i \qquad [F19]$$

FIG 8

$$delta\_t\_spark\_mmv_i(t_{k_{calc}}) = \frac{1}{N} \sum_{k=k_{calc}-N+1}^{k_{calc}} \left| \frac{t\_spark_i(t_k) - t\_spark_i(t_{k-1})}{t_k - t_{k-1}} \right| \qquad [F20]$$

$$RES\_spark_i = delta\_t\_spark\_mmv_i - \frac{1}{M-1}\sum_{j=1;j\neq i}^{M} delta\_t\_spark\_mmv_j \qquad [F21]$$

$$RES\_spark' = \begin{cases} 1 & \text{für } RES\_spark < THD_{spark}(N, MAF, TCO) \\ \frac{THD_{spark}(N, MAF, TCO)}{RES\_spark} \cdot C & \text{für } RES\_spark \geq THD_{spark}(N, MAF, TCO) \end{cases} \qquad [F22]$$

METHOD AND DEVICE FOR DETECTING A COMBUSTION MISFIRE

CROSS REFERENCE TO RELATED APPLICATIONS

This application claims the benefits of German Patent application No. 10 2005 046 953.1 filed Sep. 30, 2005 and is incorporated by reference herein in its entirety.

FIELD OF THE INVENTION

The invention relates to a method and a device for detecting a combustion misfire in a combustion chamber of a cylinder of an internal combustion engine with at least one exhaust gas tract, in which there is an exhaust gas catalytic converter and in which an exhaust gas probe is fitted upstream of the exhaust gas catalytic converter.

BACKGROUND OF THE INVENTION

Bearing in mind the increasingly strict statutory regulations with regard to the permissible pollutant emissions of motor vehicles fitted with internal combustion engines, it has become necessary to keep the pollutant emissions as low as possible during the operation of the internal combustion engine. On the one hand, this can take place by reducing the pollutant emissions, which arise during the combustion of the air-to-fuel mixture in the specific cylinder of the internal combustion engine. On the other hand, exhaust gas aftertreatment systems are used in internal combustion engines, which convert the pollutant emissions, which are generated during the combustion process of the air-to-fuel mixture in the relevant cylinders, into harmless substances. To this end, catalytic converters are used, which convert carbon monoxide, hydrocarbons, and nitrogen oxides into harmless substances. Both the specific influence of the generation of pollutant emissions during the combustion and the conversion of the pollutant components with a high degree of efficiency by an exhaust gas catalytic converter require a very accurately adjusted air-to-fuel ratio in the specific cylinder.

A lambda regulation with a linear lambda probe, which is fitted upstream of an exhaust gas and a binary lambda probe which is fitted downstream of the exhaust gas catalytic converter are known from the specialist book, "Handbuch Verbrennungsmotor", Herausgeber Richard von Basshuysen, Fred Schäfer, 2. Auflage, Vieweg & Sohn Verlagsgesellschaft mbH, Juni 2002, Seiten 526-528 ["Manual, Internal Combustion Engine", Publisher Richard von Basshuysen, Fred Schäfer, $2^{nd}$ Edition, Vieweg & Sohn Publishing House GmbH, June 2002, pp. 526-528]. A lambda desired value is filtered by means of a filter, which takes into account the gas flow times and the behavior of the sensor. Therefore, the lambda desired value filtered in this way, is the command variable of a $PII^2D$ lambda regulator, the controller output of which is the correction of an injection volume. A lambda actual value derived from the measuring signal of the linear lambda probe forms, together with the filtered lambda desired value, the standard difference of the lambda regulator.

Over and above that, modern internal combustion engines require a diagnosis to be carried out during the operation of the internal combustion engine. In this context, a monitoring is carried out to determine whether or not there are combustion misfires. Such combustion misfires may be caused by a variety of factors, for example, an error in the injection system of the internal combustion engine for example caused by an undesired non-opening of the injection valve. This can result in the non-existing metering of fuel and in this way prevent an ignition of the mixture in the cylinder. However, the cause of the error can also be a defect in the ignition system of the internal combustion engine. If, within the framework of the diagnosis such combustion misfires are detected, this may bring about a faulty input and therefore the driver of the motor vehicle in which the internal combustion engine has been fitted may be requested to visit a workshop or the misfires may only cause a faulty input that is read out within the framework of the next customer service. In this way, in order to eliminate the error in an easy manner, it is desirable that the source of the error be located.

A method for detecting combustion misfires in internal combustion engines that causes more highly pollutant exhaust gases and subsequently cause damage to catalytic converters is known from DE 199 13 746 C2. A lambda probe voltage of a lambda probe located after an exhaust gas catalytic converter is determined referred to a detected combustion misfire. The combustion misfire can for example be detected by means of testing the uneven running of said internal combustion engine. Depending on the lambda probe voltage, a conclusion is then reached on one kind of combustion misfire because of combustion misfires, a faulty injection, or another error. However, it is only possible to detect the kind of error in this way in the case of frequently occurring combustion misfires because this kind of error strongly depends on the capacity of the catalytic converter to store oxygen.

Moreover, it is well-known that internal combustion engines for example have eight cylinders, groups of four cylinders of which have been allocated to one exhaust gas bank in each case and in which a special exhaust gas tract with its own exhaust gas aftertreatment system has been allocated to each exhaust gas bank.

BACKGROUND OF THE INVENTION

The object of the invention is to create a method and a device for detecting the reason for combustion misfires or that the said method and device for accurately detecting the reason for combustion misfires is accurate.

The object of the invention is achieved by the features of the independent patent claims. Advantageous further embodiments of the invention are characterized in the sub-claims.

The invention in accordance with a first aspect is characterized by a method and a corresponding device for detecting combustion misfires in a combustion chamber of a cylinder of an internal combustion engine with a plurality of cylinders that have been allocated in at least two groups to one exhaust gas tract each. In each exhaust gas tract, an exhaust gas catalytic converter and an exhaust gas probe are fitted upstream of the exhaust gas catalytic converter. Combustion misfires are detected in one of the cylinders in accordance with at least one operating variable of the internal combustion engine and allocated to one of the groups of the cylinders. A cause of the error of combustion misfires is determined and lies in an injection system of the internal combustion engine or in an ignition system of the internal combustion engine depending on a first standard difference of a lambda regulator, which has been allocated to the group of cylinders, which has been allocated to the combustion misfires and, moreover, depending on a second standard difference of an additional lambda regulator, which has been allocated to one group of the cylinders, which has not been allocated to the combustion misfires.

According to a first aspect, the invention applies the knowledge that when the cause of the error is determined, it is possible that influences that are not caused by combustion misfires and which could possibly lead to an incorrect conclusion on the cause of the error could be reduced in this way, because they have an effect on both with regard to the group of cylinders, which has been allocated to the combustion misfires and on that group of cylinders, which has not been allocated to the combustion misfires. Above all, it is for example possible that in the event of an estimated value for a mass air flow in the cylinders of the internal combustion engine or additional load variables, which have been determined by means of a dynamic physical model of an exhaust gas tract of the internal combustion engine, the influence of a modeling fraught with errors is reduced. Over and above that, with regard to the first aspect in the case of low combustion misfiring rates, it is possible to allocate the cause of the error in an accurate manner.

The invention in accordance with a second aspect is characterized by a method and a corresponding device, which is distinguished from that in accordance with the first aspect in that the cause of the error of the combustion misfire is determined depending on a first characteristic value, which is determined depending on the controller output of the lambda regulation, which has been allocated to the group of cylinders, which has been allocated to the combustion misfires and, moreover, which is determined depending on a second characteristic value which is determined depending on the controller output of the lambda regulation, which has been allocated to one group of the cylinders, which has not been allocated to the combustion misfires.

In accordance with the second aspect of the invention, the invention applies the knowledge that the first characteristic value is influenced by the combustion misfires whereas the second characteristic value is not influenced by the combustion misfires. Due to the effect of the interferences on both characteristic values, it is possible that because of the corresponding determination of the cause of the error, depending on the first and the second characteristic value, the influence of the interferences is reduced or even eliminated and because of this it is in particular possible to determine the cause of the error in a reliable manner. Above all, it is also for example possible here, in the event of an estimated value for a mass air flow in the cylinders of the internal combustion engine or another load variable, which is determined by means of a dynamic physical model of an exhaust gas tract, an influence of a modeling fraught with errors is reduced. Over and above that, in the event of a high combustion misfiring rate, it is possible to allocate the cause of the error in an accurate manner.

A combination of the first and the second aspects of the invention has the advantage that both in the case of low combustion misfiring rates and in the case of high combustion misfiring rates, the cause of the error can easily be allocated in an accurate manner.

In accordance with an advantageous embodiment of the invention, the first or the second characteristic value is determined in such a way that it is representative of an integral part of the output controller of the specific lambda regulation. In this context, the knowledge is applied that the integral part is representative of a stationary regulator intervention of the specific lambda regulation, which on the other hand, is characteristic of the occurrence of combustion misfires in particular with a high combustion misfiring rate.

In this context, it is advantageous if the first or the second characteristic value is determined depending on taking a sliding mean for the controller output of the specific lambda regulation. In this way, it is in particular possible to determine the stationary regulator intervention in an easy manner.

In accordance with an additional advantageous embodiment of the invention, the cause of the error is determined depending on a first trim characteristic value, which is determined depending on a controller output of a trim regulator, which has been allocated to the group of cylinders, which has been allocated to the combustion misfires and, moreover, which is determined depending on a second trim characteristic value, which is determined depending on the controller output of a trim regulator, which has been allocated to the group of cylinders, which has not been allocated to the combustion misfires. Therefore, it is in particular possible in this way to allocate the cause of the error in a correct manner, in particular, in the case of average and high combustion misfiring rates. A trim regulator is characterized in that its controller output is determined depending on a measuring signal of an exhaust gas probe, which is fitted downstream of the specific exhaust gas catalytic converter and in this way it is in particular possible to compensate for a behavior of the specific exhaust gas probe that is fitted upstream of the exhaust gas catalytic converter changing over the operating time of the internal combustion engine.

In accordance with an additional advantageous embodiment of the invention, the cause of the error is determined depending on the desired value for the air-to-fuel ratio, which has been allocated to the group of cylinders, which has been allocated to the combustion misfires. In this context, the desired value preferably relates to that value at which the gas flow times and the probe dynamics of the exhaust gas probe upstream of the exhaust gas catalytic converter and, if required, a behavior of the exhaust gas catalytic converter are taken into account. Therefore, it is in particular also possible in this way to allocate the cause of the error to a full load operation of the internal combustion engine or in this context to an enrichment of the air-to-fuel mixture supplied to the internal combustion engine in order to protect the exhaust gas catalytic converter in a very accurate manner.

Over and above that, it is also possible to reduce or eliminate the effect of interferences by means of a superposed forced excitation in the case of the lambda regulation, which could otherwise act as interferences with regard to determining the cause of the error.

In accordance with an additional advantageous embodiment of the invention, the cause of the error is determined depending on a cylinder-specific uneven running value of said internal combustion engine, which has been allocated to the cylinder in which the combustion misfires were detected, and allocated to the other cylinders depending on additional cylinder-specific uneven running values of said internal combustion engine. In this way, it is in particular possible in the case of sporadic combustion misfires whose frequency increase with a decreasing quantity of fuel, to allocate very accurately the cause of the error, if it is in the injection system. In this context, the knowledge is applied that in the case of this cause of the error, which is also called low flow, also in the case of points in time or operating conditions, in which there are no combustion misfires or hardly any combustion misfires occur, the uneven running of the internal combustion engine has clearly changed compared to additional cylinder-specific uneven running values of said internal combustion engine, which have been allocated to the other cylinders even when its absolute value has not yet reached the value that is characteristic of combustion misfires.

In accordance with an additional advantageous embodiment of the invention, the cause of the error is determined depending on a cylinder-specific duration of the spark of an allocated spark plug, which has been allocated to the cylinder, in which the combustion misfires were detected, and depending on additional cylinder-specific durations of the spark of other spark plugs, which have been allocated to other cylinders. In this way, it is in particular possible in the case of operating points of the internal combustion engine with a low cutoff that the cause of the error can be clearly allocated in an accurate manner. Above all, it is possible in said way that the cause of the error in the ignition system can be determined in an accurate manner. This is based on the knowledge that in particular in the case of the operating points of a low cutoff, exhaust gas packages that have been allocated to the individual cylinders on reaching the upstream exhaust gas probe have very often to a large extent already been mixed with the exhaust gas packages of other cylinders. Therefore, this results in the fact that a cylinder-individual influence on actually occurred combustion misfires in one of the cylinders, less characteristically with a view to the allocation to the specific cylinder influences the first standard difference of the lambda regulation, which has been allocated to the group of cylinders, which has been allocated to the combustion misfires, and influences less characteristically the controller output of the lambda regulation, which has been allocated to the group of cylinders, which has been allocated to the combustion misfires.

In accordance with an additional advantageous embodiment of the invention, the cause of the error is determined by evaluating a plurality of detected combustion misfires, which has been allocated to the group of cylinders, which has been allocated to the combustion misfires. In this way, it is possible to remove statistical fluctuations, in particular a vibration, by means of filtering and indeed, with a high probability and in this way the assurance of a correct allocation of the cause of the error is increased.

In this context, it is in particular advantageous if the number of the majority of detected combustion misfires depends on a rotational speed and/or a load variable. In this way, it is then in particular possible in the different operating areas of the internal combustion engine to carry out the allocation of the cause of the error in an accurate manner.

In accordance with an additional advantageous embodiment of the invention, the cause of the error is determined by evaluating the majority of detected combustion misfires, which were detected during a predetermined point in time. In this way, it is also in particular possible to carry out an accurate allocation in an easy manner.

In accordance with an additional advantageous embodiment of the invention, the predetermined point in time depends on the rotational speed and/or a load variable. In this way, it is also in particular possible to carry out in the different operating points an accurate allocation of the cause of the error.

In accordance with an additional advantageous embodiment of the invention, the cause of the error is determined depending on a combustion misfiring rate of a specific cylinder, which has been allocated to the group of cylinders, to which the combustion misfire has been allocated, and/or a probe ageing of the exhaust gas probe which has been allocated to the group of cylinders to which the combustion misfires have been allocated. In this way, it is in particular possible to guarantee a reliable allocation of the cause of the error and this in particular over a long operating time of the internal combustion engine.

BRIEF DESCRIPTION OF THE DRAWINGS

The invention is explained in detail below as an embodiment on the basis of the accompanying drawings.
They are as follows.

DETAILED DESCRIPTION OF THE INVENTION

Figure 1:
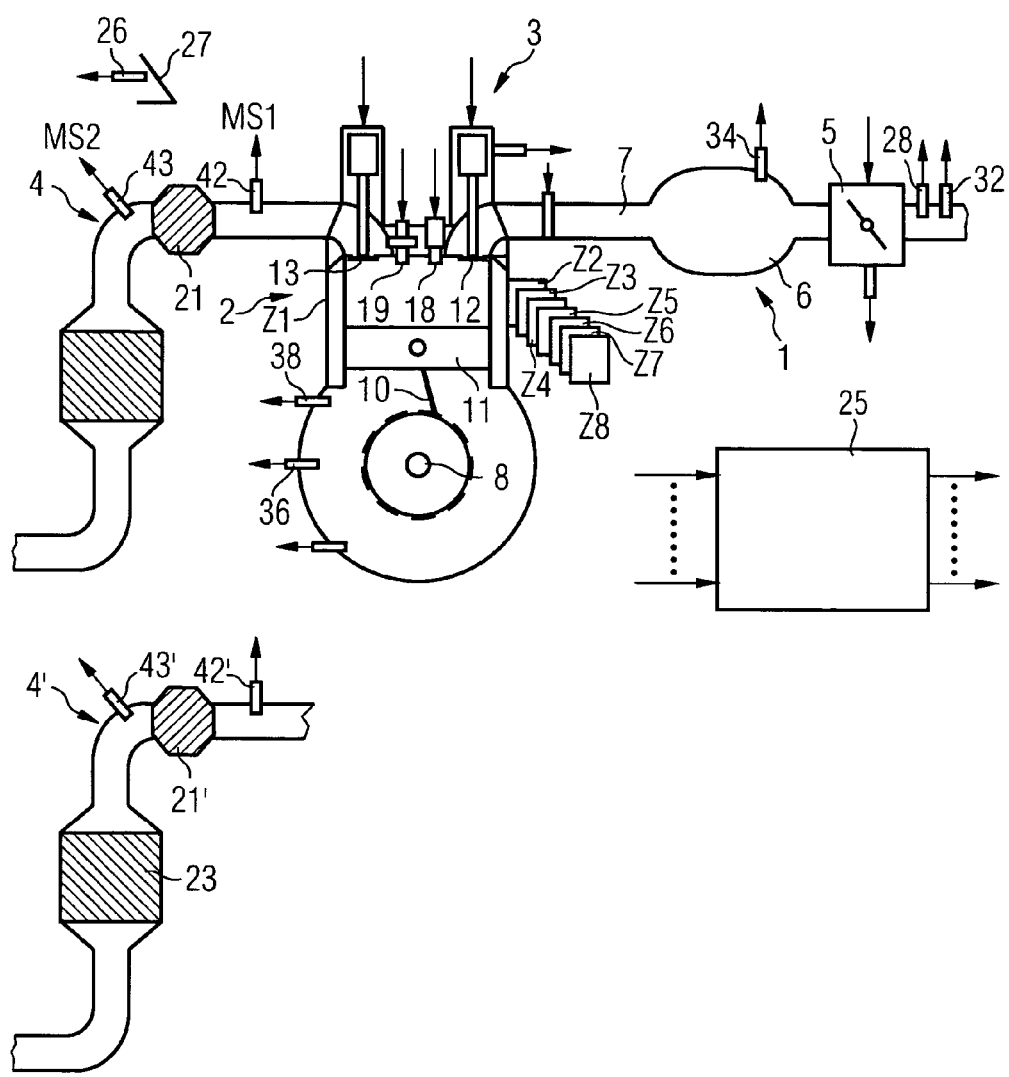
FIG. 1 an internal combustion engine,
FIG. 2 a block wiring diagram of a part of a control device of the internal combustion engine in accordance with FIG. 1,
FIG. 3 a flow chart of a program for detecting combustion misfires,
FIGS. 4 to 8 calculation specifications for first to fourth residues or an ignition residue,
FIGS. 9A-D signal curves and
FIG. 10 calculation specifications for a fifth residue.
Elements with the same design and function are characterized in all the figures with the same reference symbols.

An internal combustion engine (FIG. 1) includes an intake tract 1, an engine block 2, a cylinder head 3 and an exhaust gas tract 4. The intake tract 1 preferably includes a throttle valve 5, furthermore a manifold 6 and an intake pipe 7, which is guided to a cylinder Z1 via an intake port in the engine block 2. The engine block 2 also includes a crankshaft 8, which is connected to the piston 11 of a cylinder Z1 by means of a connecting rod 10.

The cylinder head 3 comprises a drive with a gas intake valve 12 and a gas exhaust valve 13.

Furthermore, the cylinder head 3 also comprises both an injection valve 18 and a spark plug 19. As an alternative, the injection valve 18 can also be fitted in the intake pipe 7. The injection valve 18 forms part of an injection system, which also comprises a fuel supplying device and a control for the injection valve and preferably also a fuel pump. The spark plug 19 forms part of an ignition system, which also comprises a control for the spark plug 19.

An exhaust gas catalytic converter is fitted in the exhaust gas tract 4, said catalytic converter being embodied as a three way catalytic converter 21. Moreover, an additional exhaust gas catalytic converter is preferably fitted in the exhaust gas tract, which is embodied as an NOx catalytic converter 23.

The internal combustion engine comprises a plurality of cylinders Z1-Z8, which are divided into at least two groups to each of which an individual exhaust gas tract has been allocated. For example, both a first group and a second group have been provided with cylinders Z1-Z8, it being possible to allocate the cylinders Z1-Z4 to the first group and the cylinders Z5-Z8 to the second group. The exhaust gas tract 4—referred below to as the first exhaust gas tract 4—has been allocated to the first group. A second exhaust gas tract 4' has been allocated to the second group, which has been embodied corresponding with the first exhaust gas tract.

In addition, a control device 25 is provided to which sensors have been allocated, said sensors detecting the different measured quantities and in each case determining the value for the measured quantity. The operating variables in addition to the measured quantities also comprise variables derived from these variables. The control device 25 determines, in accordance with at least one of the measured quantities, the controller outputs, which are then converted into one or several adjusting signals for controlling the final control elements by means of corresponding actuators. The control device 25 can also be referred to as a device for controlling the internal combustion engine or a device for detecting combustion misfires.

The sensors are a pedal position indicator 26 which detects the position of an acceleration pedal 27, a mass air flow meter 28 which detects a mass air flow upstream of the throttle valve 5, a first temperature sensor 32 which detects the intake air temperature, an intake pipe pressure 34 in a manifold 6 which detects the intake pipe pressure, a crankshaft angle sensor 36 which detects a crankshaft angle to which a rotational speed N is allocated, a second temperature sensor 38 which detects a coolant temperature TCO.

Moreover, provision has been made for a first exhaust gas probe 42 of the first exhaust gas tract 4, which is fitted upstream of or in a three-way catalytic converter 21 and which records a residual oxygen content of the exhaust gas and the measuring signal MS1 of which is characteristic of the air-to-fuel ratio in the combustion chamber of the allocated cylinder or the allocated cylinders Z1-Z4 and upstream of the first exhaust gas probe 42 of the first exhaust gas tract 4 before the oxidation of the fuel, referred below to as the air-to fuel ratio in the allocated cylinders Z1-Z4. In the event of fitting in the three-way catalytic converter 21 of the first exhaust gas tract 4, the first exhaust gas probe 42 is fitted in the three-way catalytic converter 21 of the first exhaust gas tract 4 in such a way that a part of the volume of the catalytic converter is located upstream of the first exhaust gas probe 42 of the first exhaust gas tract 4.

Moreover, provision has been made for a second exhaust gas probe 43 of the first exhaust gas tract 4, which is fitted downstream of the three-way catalytic converter 42 of the first exhaust gas tract 4 and which records a residual oxygen content of the exhaust gas and the measuring signal MS2 of which is characteristic of the air-to-fuel ratio in the combustion chamber of the allocated cylinders Z1-Z4 and upstream of the second exhaust gas probe 43 of the first exhaust gas tract 4 before the oxidation of the fuel, referred below to as the air-to-fuel ratio downstream of the exhaust gas catalytic converter of the first exhaust gas tract 4.

The first exhaust gas probe 42 of the first exhaust gas tract 4 preferably is a linear lambda probe. The second exhaust gas probe 43 of the first exhaust gas tract 4 is a binary lambda probe. However, it can also be a linear lambda probe.

Corresponding first and second exhaust gas probes 42', 43' have also been allocated to the second exhaust gas tract 4'. The same applies to a corresponding three-way catalytic converter 21'.

Depending on the embodiment of the invention, any subset of the sensors or even additional sensors can be made available in each case.

The final control elements are for example a throttle valve 5, the gas intake valves or the gas exhaust valves 12, 13, a injection valve 18 or a spark plug 19.

The final control elements and sensors are shown in particular with regard to the cylinder Z1 in FIG. 1. Corresponding final control elements and, if required, sensors have also been allocated to the additional cylinders in a preferred manner. Both an injection valve 18 and a spark plug 19 have preferably been allocated to each cylinder in this way.

Figure 2:
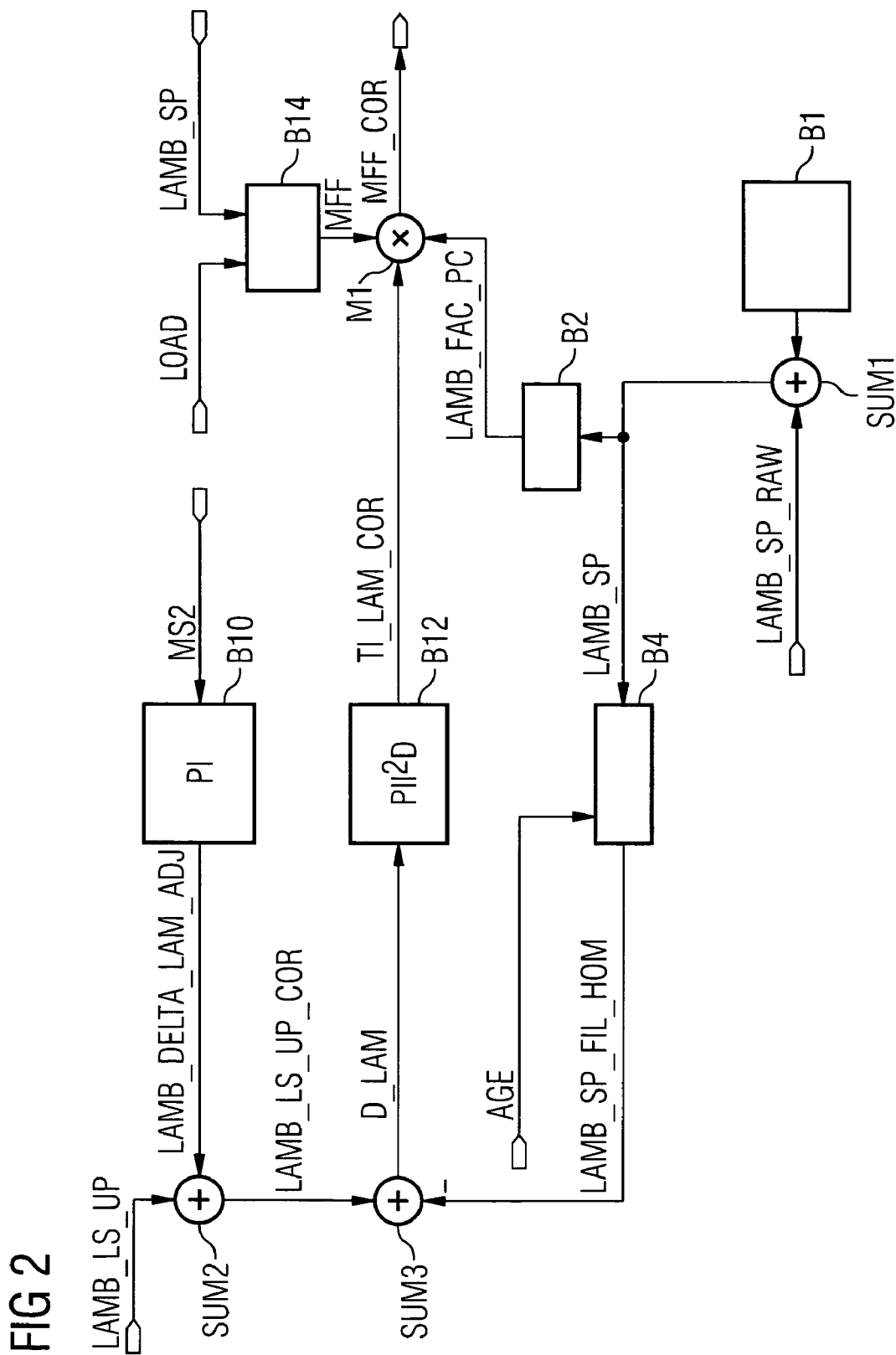
Figure 9A:
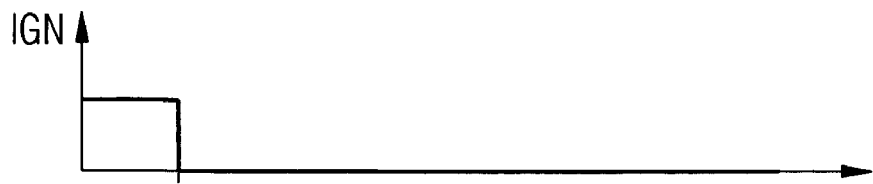
Figure 9B:
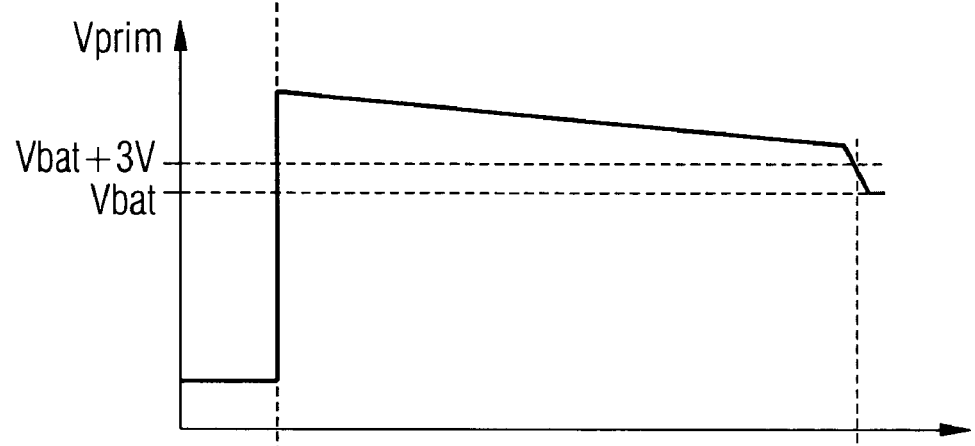
Figure 9C:
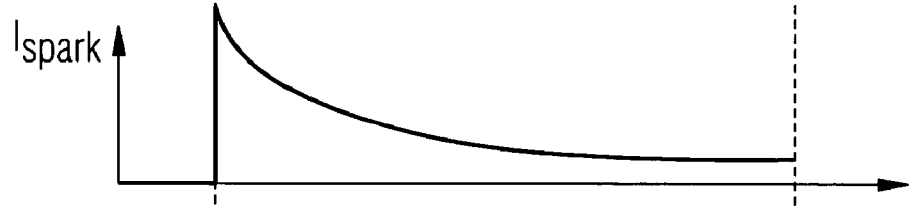
Figure 9D:
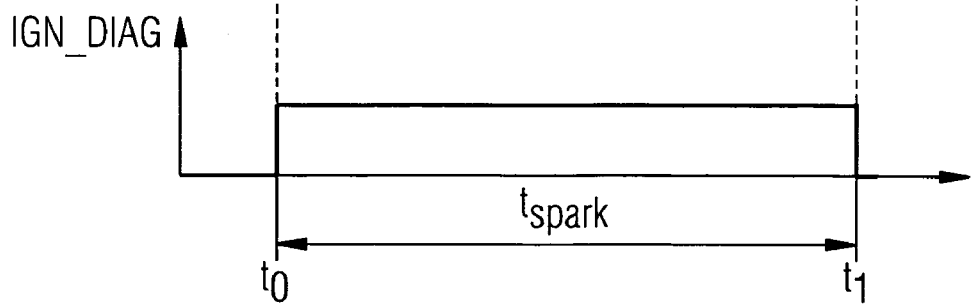

FIG. 2 shows a block wiring diagram of a part of a control device 25. In this way, the shown part, in an exemplary manner, refers to the first group of cylinders Z1-Z4. Referring to the second group or possible additional groups of cylinders Z5-Z8, a corresponding functionality has likewise been embodied in the control device 25.

A predetermined raw air-to-fuel ratio LAMB_SP_RAW can be given in a particularly simple embodiment. However, it is preferably determined, for example, depending on the actual operating mode of the internal combustion engine such as a homogenous operation or shift operation and/or depending on the operating variables of the internal combustion engine.

In a block B1, a forced excitation is determined and summed with the predetermined raw air-to-fuel ratio LAMB_SP_RAW in a first summing point SUM1. The output variable of the summing point is then a predetermined air-to-fuel ratio LAMB_SP of the allocated cylinders Z1 to Z4. The predetermined air-to-fuel ratio LAMB_SP is fed to a block B2, which comprises a pilot control and generates a lambda pilot control factor LAMB_FAC_PC depending on the predetermined air-to-fuel ratio LAMB_SP.

In a block B4, a filter is embodied by means of which the predetermined air-to-fuel ratio LAMB_SP is filtered and a predetermined filter air-to-fuel ratio LAMB_SP_FIL_HOM is generated in this way.

The filter is embodied in order to approximate the behavior of the first exhaust gas probe 42 of the first exhaust gas tract 4 with regard to the gas flow times and its response characteristic. For that, a probe ageing rate AGE of the first exhaust gas probe 42 is taken into account in a preferred manner. The probe ageing rate AGE is determined by evaluating the attenuation of the recorded lambda signal amplitude, represented by the measuring signal MS1 during a superposition of an increased forced excitation amplitude. In this case, the rotational speed N and/or the load LOAD is preferably taken into account.

In a block B10 a trim regulator is embodied, which is preferably embodied as a PI regulator. The measuring signal MS2 of the second exhaust gas probe 43 of the first exhaust gas tract 4 is fed to the trim regulator. Its controller output—referred below to as the trim regulator intervention LAMB_DELTA_LAM_ADJ—is a shift value for an air-to-fuel ratio LAMB_LS_UP in the allocated cylinders Z1 to Z4 recorded by the first exhaust gas probe 42, which is determined depending on the measuring signal MS 1 of the first exhaust gas probe 42.

In a second summing point SUM2, the sum of the recorded air-to-fuel ratio LAMB_LS_UP and the shift value are determined and in this way, a corrected recorded air-to-fuel ratio LAMB_LS_UP_COR is determined. Depending on the predetermined filtered air-to-fuel ratio LAMB_SP_FIL_HOM and the corrected recorded air-to-fuel ratio LAMB_LS_UP_COR, in a third summing point SUM3, by forming a difference, a standard difference D_LAMB is determined, which is an input variable of block B12.

The standard difference D_LAMB is preferably formed by forming the difference between the reciprocal value of the predetermined filtered air-to-fuel ratio LAMB_SP_FIL_HOM and the reciprocal value of the corrected recorded air-to-fuel ratio LAMB_LS_UP_COR or by forming the difference between the corrected recorded air-to-fuel ratio LAMB_LS_UP_COR and the predetermined filtered air-to-fuel ratio LAM_SP_FIL_HOM.

In a block B12, a lambda regulator is embodied and indeed preferably as a PII$^2$D regulator. The controller output of the lambda regulator of block B12 is a lambda regulator intervention TI_LAM_COR.

Moreover, provision has been made for a block B14, in which depending on a load variable LOAD and the predetermined air-to-fuel ratio LAMB_SP, a quantity of fuel MFF to be metered is determined. Preferably, the load variable LAMB_SP in this case is a volume of air per working cycle flowing into the specific combustion chamber of the relevant cylinders Z1-Z4, which have been allocated in each case. In a multiplication point M1, a corrected quantity of fuel MFF_COR to be metered is determined by forming the product of the quantity of fuel MFF to be metered, of the lambda pilot control factor LAMB_FAC_PC and the lambda regulator intervention TI_LAM_COR. The injection valve 18 is then activated accordingly for metering the corrected quantity of fuel MFF_COR to be metered.

In an operation of the internal combustion engine where there are no combustion misfires, a slight standard difference D_LAMB only results from component tolerances and errors in the prediction of the cutoff as well as from the quantity of fuel MFF to be metered derived from it in each case.

In order to detect combustion misfires, a program is stored in the control device 25 and is processed during the operating cycle, which is explained below by means of the flow chart in FIG. 3. The program is started in a step S1, preferably close to a start of the internal combustion engine. In a step S1, it is possible to initialize the variables, if required.

In a step S2, an uneven running ER of the internal combustion engine is determined. This preferably takes place depending on a curve of the rotational speed N. For that, time segments TSEG that can be allocated to the individual cylinders Z1-Z4 are in particular evaluated in a preferred way. A time segment TSEG correlates with a crankshaft area, which has been allocated to the specific cylinder Z1-Z8 and the crankshaft angle of which depends on the number of cylinders in the internal combustion engine and the kind of internal combustion engine in each case. This crankshaft angle area, for example, in the case of an internal combustion engine with eight cylinders Z1-Z8, which are operated in four-stroke operation, corresponds to a 90 degrees crankshaft angle.

The uneven running ER of the internal combustion engine can for example be determined depending on a deviation of the time segment TSEG which has been allocated to the specific cylinder from a medium time segment.

In a step S4, combustion misfires MISF are then detected and indeed depending on the uneven running of the internal combustion engine. To that end, it is for example possible to compare the uneven running ER of the internal combustion engine with a value which can be predetermined, the exceeding of which is characteristic of the combustion misfire. Moreover, in a step S4, a combustion misfiring rate MISFR is determined. It may happen for example that, in the case of consecutively following passages of steps S4, the combustion misfires MISF detected in the previous passages can be set in relation to the total number of passages of a step S4 during the point in time studied.

The following steps are preferably only processed if combustion misfires MISF were detected in a step S4.

In a step S6, a total residue RES is determined depending on first to fifth residues RES_1 to RES_5 and depending on an ignition residue RES_spark't. However, it can also be determined depending on any subset of the first to fourth residues RES_1 to RES_5 and the ignition residue RES_spark', which comprises the first residue RES_1. The total residue RES is a measure, for the cause of the error of the combustion misfires MISF detected in a step S4 in one of the cylinders Z1 to Z8. Depending on the total residue, it can be concluded that the cause of the error lies in the injection system of the internal combustion engine or in the ignition system. It is possible to determine the total residue RES by means of a multiplicative and/or an additive linking of the individual residues RES_1 to RES_5, RES_spark', if required, with due consideration of different weightings of the individual residues RES_1 to RES_5, RES_spark'. The total residue RES is preferably determined by the weighted addition of the individual residues RES_1 to RES_5, RES spark'. However, it is also possible in this case, to determine the total residue RES by means of any combination of additions, which also includes a subtraction, and multiplications, which also includes a division of the individual residues RES_1 to RES_5, RES_spark', in this way for example by means of the weighted addition of the first to fifth residues RES_1 to RES_5 and the multiplication of the resulting term by the ignition residue RES_spark'. The determination of the individual residues RES_1 to RES_5, RES_spark' is explained in detail below with reference to the FIGS. 4 to 10.

The total residue RES is in each case determined referred to those cylinders Z1 to Z8 in which combustion misfires were detected in a step S4, it then being possible that the calculations of the individual residues RES_1 to RES_5, RES spark' can refer to the specific group of cylinders Z1 to Z8 to which the one cylinder Z1 to Z8 has been allocated in which the combustion misfires were detected.

Moreover, the total residue RES is determined by taking the mean MV in accordance with the determined total residues RES and indeed of a predetermined number of these total residues RES, it for example being possible in this case that after the initial detection of combustion misfires in a step S4, a predetermined number of subsequently determined total residues RES are used, which for example are determined for each working cycle with detected combustion misfires MISF of the cylinder in which the combustion misfires were originally detected. Therefore, it is for example possible in this way to allocate a ten to this number in a preferred manner. However, it can also advantageously depend on the rotational speed N and/or a load variable, which can for example be that of the mass air flow MAF in cylinders Z1 to Z8 of the internal combustion engine or that of the intake pipe pressure. As an alternative, the determination can also take place over a predetermined point in time, which preferably depends on the rotational speed N and/or the load variable LOAD.

In a step S8, a diagnosis threshold value THD_RES is determined, and indeed preferably depending on the rotational speed N and/or the mass air flow MAF and/or the combustion misfiring rate MISFR and/or on a degree of ageing AGE of the exhaust gas probe 42. To this end, it is for example possible to make provision for one or a plurality of performance graphs, which were previously determined in tests, for example, in an engine test bench, or for example also by means of simulations and indeed in such a way that when the diagnosis threshold value THD_RES is exceeded by the total residue, the cause of the error lies in the injection system and failing that the cause of the error lies in the ignition system.

In a step S10, a test is then performed to determine whether or not the total residue RES is greater than the diagnosis threshold value THD_RES. Should this not be the case, then an error is detected in the ignition system in a step S12, which is referred below to as the MISF_IGN. However, should this be the case, then an error is detected in the injection system MISF_INJ in a step S14. The processing is subsequently continued in a step S16 in which the program, if required, is interrupted for a waiting period which can be predetermined or a crankshaft angle, which can be predetermined before the processing is then continued again in a step S2. In terms of processing steps S2 to S16, it must with reference to their sequence in time, in all cases be ensured that the individual calculations are carried out often enough in order to be able to detect possibly occurring combustion misfires MISF for each cylinder of the internal combustion engine for each working cycle. Over and above that, if required, the necessary measured quantities or the operating variables are also recorded parallel to the sequence of steps S2 to S16 and, if required, stored intermediately. Over and above that, the functionality in accordance with the flow chart in FIG. 3 can also be available several times in the control device 25 and in this way in particular for each group of the cylinders Z1 to Z8 or also individually for the individual cylinders Z1 to Z8.

FIG. 4 gives calculation specifications for determining the first residue RES_1. The occurrence of combustion misfires in MISFR based on errors in the ignition system of the internal combustion engine is characterized by an unburnt, ignitable air-to-fuel mixture, which is fed in the form of packets during the specific exhaust stroke of the relevant cylinders Z1 to Z8 allocated to the exhaust gas tract 4, 4' in each case. The first exhaust gas probe 42 can then not bring the air-to-fuel mixture of the corresponding exhaust gas package fully into a chemical equilibrium. Based on the diffusion rates depending on the size of the molecules in a diffusion barrier of the first exhaust gas probe 42, in the case of an actual stoichiometric air-to-fuel ratio in the specific cylinder, an air-to-fuel ratio LAMB_LS_UP recorded by the first exhaust gas probe 42 is then obtained which is greater than one.

On the other hand, if an error in the injection system actually hinders the introduction of fuel into one of the cylinders Z1 to Z8 or the introduction of fuel is clearly reduced, corresponding combustion misfires MISFR will likewise occur. If the metering of fuel by the specific injection valve 18 does not take place at all, which is also referred below to as stuck closed, the previously drawn in air is fed to the specific exhaust gas tract 4, 4' via the exhaust stroke. In this case, the first exhaust gas probe, with its measuring signal MS1 signals an air-to-fuel ratio recorded by the first exhaust gas probe 42, 42' in the cylinders allocated to it, which clearly exceeds one, i.e. a very lean air-to-fuel mixture. If the cause of the error of the relevant combustion misfires MISF can be traced back to the injection system of the internal combustion engine, then it is in this way possible to take as a basis a clearly greater dynamic deviation between the air-to-fuel ratio LAMB_LS_UP recorded by the first exhaust gas probe 42 in the allocated cylinders from the predetermined filtered air-to-fuel ratio LAMB_SP_FIL_HOM in the allocated cylinders. This is particularly clear in the case of rather low combustion misfiring rates MISFR. Over and above that, an error in the injection system also clearly acts more dynamically on the lambda regulator intervention TI_LAM_COR compared with an error in the ignition system of the internal combustion engine.

In the following FIGS. 4 to 6, an index j in each case refers to the group of cylinders Z1 to Z8, in which in the processing of step S4, combustion misfires MISF were detected in one of the cylinders from the specific group in a step S4. An index i refers to a group deviating from the above. In this way, if a combustion misfire in a step S4 was detected in a cylinder Z3, which has been allocated to the first group, then the index j in each case refers to the first group and should there only be another second group, the index i refers to the second group. However, should there be more than two groups of cylinders, then i can refer to any group apart from the first group in this case, it then being possible in this group, which is referred to by the index i, that combustion misfires have not taken place in one of the cylinders. To make it easier to understand, it is assumed that the combustion misfire was detected in one of the cylinders of the first group, in this way for example in the cylinder Z3. As a matter of course, this is only implemented in such a way for reasons of a detailed explanation and the accordingly adapted specifications can also be used and for determining corresponding residues for the reversed case, in which in another group, in this way for example in the second group of cylinders, the combustion misfires MISF were then detected in one of the cylinders allocated to this specific group.

$t_{mis}$ refers to the point in time of the detection of the relevant combustion misfires MISFR, it being possible in this case, that reference is not made to the mathematical detection here but to the correlation with the actually occurring combustion misfire. This also applies to other appropriate points in time, which still have to be explained in an according manner. $\Delta t$ is a predetermined point in time, for example corresponding to approximately 5 to 10 crankshaft revolutions in the case of the specific rotational speed N. A residue standard difference LAMB_DIF_RES is determined in accordance with the calculation specification F1. The residue standard difference LAMB_DIF_RES conforms to a maximum deviation of the air-to-fuel ratio LAMB_LS_UP recorded by the first exhaust gas probe 42 in the allocated cylinders Z1 to Z4 from the predetermined filtered air-to-fuel ratio LAMB_SP_FIL_HOM in the likewise allocated cylinders Z1 to Z4 and indeed over the point in time $\Delta t$ starting with the point in time $t_{mis}$ of the detection of the corresponding combustion misfire MISFR. It is also possible to replace the air-to-fuel ratio recorded by the first exhaust gas probe 42 in the allocated cylinders Z1 to Z4 with the corrected recorded air-to-fuel ratio LAMB_LS_UP_COR in the calculation specification F1. Over and above that, it is in principle also possible to use possible reciprocal values of the terms of the calculation specification F1. A kmax is an index for that point in time $t_{kmax}$ of the point in time in which the maximum deviation of the calculation specification F1 was detected. In the following, this is referred to as the point in time of the maximum lambda deviation.

Moreover, in accordance with the calculation specification F2, the residue standard difference $LAMB\_DIF\_RES_i$ is determined for the second group of the cylinders Z5 to Z8 is determined and indeed by forming the difference between the air-to-fuel ratio recorded by the first exhaust gas probe 42' in the allocated cylinders Z5 to Z8 and the predetermined filtered air-to-fuel ratio LAMB_SP_FIL_HOM in the allocated cylinders Z5 to Z8 of the second group in each case and indeed referred to the point in time $t_{kmax}$ of the maximum lambda deviation. Also in the case of the calculation specification F2, possible adaptations can be carried out in the calculation specification F1 in a corresponding manner.

In accordance with a calculation specification F3, a lambda regulator intervention residue $TI\_LAM\_COR\_RES_j$ is determined for the first group of cylinders Z1 to Z4 and represents a first characteristic value, whereas in accordance with a calculation specification F4, the corresponding lambda regulator intervention residue $TI\_LAM\_COR\_RES_i$ is determined for the second group of cylinders Z5 to Z8, which represents a second characteristic value.

The first residue RES_1 is then determined according to a calculation specification F6 by adding two terms. The first term is a difference between the residue standard difference $LAMB\_DIF\_RES_j$, the first group of cylinders Z1 to Z4 and the residue standard difference $LAMB\_DIF\_RES_i$ of the second group of cylinders Z5 to Z8. The second term is a difference weighted with a weighting value C1 between the lambda regulation intervention residue $TI\_LAM\_COR\_RES_j$ of the first group of cylinders and the lambda regulator intervention residue $TI\_LAM\_COR\_RES_i$ of the second group of cylinders Z5 to Z8.

The combination of the two terms is advantageous because in the case of high combustion misfiring rates MISFR by the intervention of the lambda regulator, which has been allocated to the specific group of cylinders Z1 to Z8 in which the combustion misfire or the combustion misfires was/were detected, the residue standard difference $LAMB\_DIF\_RES_j$ also of the first group of cylinders Z5 to Z8 takes on a value which is small in terms of amount and in this way hampers a diagnosis of the cause of the error. However, exactly for this case of a high combustion misfiring rate, the lambda regulator residue $TI\_LAM\_COR\_RES_j$ is then increased in amount in a corresponding manner and in this way contributes to a higher diagnostic reliability of the cause of the error of combustion misfires.

Above all, in transient operation of the internal combustion engine, an incorrect prediction of the load variable LOAD may result in errors of the specific air-to-fuel ratio in the combustion chambers of the corresponding cylinders Z1 to Z8 that can be traced back to it in both the first group and the second group. By forming the differences of the relevant residue standard differences $LAMB\_DIF\_RES_j$, $LAMB\_DIF\_RES_i$ and the lambda regulator intervention residues $TI\_LAM\_COR\_RES_j$, $TI\_LAM\_COR\_RES_i$, the resulting error is in essence eliminated because it occurs in the same way in both groups.

The prediction of the load variable LOAD takes place in a regular manner by means of a physical model of the intake tract 1 fitted in the engine control 1, which is also referred to as the intake pipe model. In this way, in accordance with the specifications for determining the first residue RES_1 it is possible to greatly reduce stationary but, above all, also transient inaccuracies of the intake pipe model pertaining to its influence on the allocation of the specific cause of the error of the combustion misfire and in this way allow a clearly more accurate allocation of the cause of the error independent from inaccuracies in for example the intake pipe model.

Based on FIG. 5, the calculation specifications for determining the second residue RES_2 is explained in detail, through which the influence of the trim regulator in the case of a detected combustion misfire MISF is taken into account in one of the cylinders of the first group.

In accordance with a calculation specification F10, a trim regulator residue LAMB_DELTA_LAM_ADJ_RES by taking the mean of trim regulator interventions $LAMB\_DELTA\_LAM\_ADJ_j$ of the first group of cylinders Z1 to Z4 and indeed through N+1 different values that were determined over N previous scanning steps. The scanning steps can for example be apart from one another of the order of magnitude of 10 ms. The mean of the trim regulator interventions $LAM\_DELTA\_LAM\_ADJ_j$ represents first trim characteristic values.

By means of an analog calculation specification F11, a trim regulator residue $LAMB\_DELTA\_LAM\_ADJ\_RES_i$ is determined for the second group of cylinders Z5 to Z8. In this case, corresponding values of the trim regulator intervention $LAMB\_DELTA\_LAM\_ADJ_i$ of the second group of cylinders Z5 to Z8 are then used. The mean of the trim regulator interventions $LAM\_DELTA\_LAM\_ADJ_i$ represent second trim characteristic values in this case.

By means of combustion misfires MISF in which third cylinders mentioned by way of example, which have been allocated to the first group of cylinders Z1 to Z4, which were caused by an error in the ignition system, the unburnt fuel arrives in the specific exhaust gas tract 4 and likewise oxygen. This leads to the measuring signal MS1 of the first lambda probe 42 being representative of a making the exhaust gas lean in the area of the first exhaust gas probe 42. The lambda regulation compensates for this by increasing the lambda regulator intervention TI_LAM_COR and in this way increases the corrected quantity of fuel MFF_COR to be metered. The unburnt air-to-fuel ratio then arrives in the exhaust gas catalytic converter, which is embodied as a three-way catalytic converter 21 and is oxidized there under discharging of the oxygen stored in the catalytic converter. This results in the fact that the measuring signal MS2 of the second exhaust gas probe 43 is shifted towards 'rich'. The trim regulator makes an attempt to counteract this by reducing the trim regulator intervention LAMB_DELTA_LAM_ADJ.

The second residue is then determined independent from the trim regulator intervention residues $LAMB\_DELTA\_LAM\_ADJ\_RES_j$ and $LAMB\_DELTA\_LAM\_ADJ\_RES_i$ of the first group and the second group of the cylinders Z1 to Z8 such as for example in accordance with the calculation specification F12. To this end, a time delay $\Delta t_{OSC}$ is in each case taken into account compared to the point in time $t_{kmax}$ in a preferred manner, which has been allocated to the maximum lambda deviation in the first exhaust gas probe 42. The time delay $\Delta t_{OSC}$ in a preferred manner depends on the rotational speed N, the mass air flow MAF, the combustion misfiring rate MISFR, the capacity of the exhaust gas catalytic converter to store oxygen, the monolith temperature of the exhaust gas catalytic converter 21 and the present oxygen load level of the exhaust gas catalytic converter 21.

In the case of a combustion misfire MISF, which is determined by an error in the ignition system, it is possible that the second residue RES_2 allows the total residue RES to be reduced and in this way increases the diagnostic reliability because a lower total residue RES is characteristic of an error in the ignition system.

When the internal combustion engine is operated at a predetermined air-to-fuel ratio LAMB_SP in the allocated cylinders Z1 to Z4, which is enriched compared to a stoichiometric value, which for example takes place during an operation under a full load or the catalytic converter protection enrichment, a characteristic change in the residue standard difference LAMB_DIF_RES decreases if there are combustion misfires. In this way, without a correction only a slight assurance is then still given in a step S10 when the cause of the error has been allocated based on the comparison with the diagnosis threshold value THD_RES in a step S10 (FIG. 3).

By taking into account a third residue RES_3, F13, which depends on the predetermined filtered air-to-fuel ratio $LAMB\_SP\_FIL\_HOM_j$ at the point in time $t_{kmax}$ of the maximum lambda deviation, it is possible in these cases that the full load operation or the catalytic converter protection enrichment can clearly allow a more reliable allocation of the cause of the error.

Referring to the fourth residue RES_4 and the ignition residue RES_spark' and the calculation specifications F16 to F22 needed for its determination and explained in detail below, the index i for those cylinders for which, on processing step S4, of combustion misfires MISF it was detected, whereas the index j refers to other cylinders, which could also have been allocated to the same group or also to any other group of cylinders Z1 to Z8.

By taking into account the fourth residue RES_4, it is possible that the reliability can then be increased when the cause of the error of the combustion misfire MISF is detected if the specific combustion misfire MISF is caused by a lower quantity of injected fuel, which is also referred to as low flow. In accordance with a calculation specification F16, an average cylinder-specific uneven running ERR_CYL_mmv of the internal combustion engine is determined in each case by averaging the cylinder-specific uneven running ER_CYL of the internal combustion engine by using a predetermined number of N scanning steps. The number N of the scanning steps can for example be 100. The individual scanning steps can for example be apart from one another of the order of magnitude of 10 ms. It should be ensured that per working cycle, at least, one cylinder-specific uneven running per cylinder Z1-Z8 is determined in each case. Here, the index 1 is a place holder for any of the cylinders Z1 to Z8. However, $t_{kcalc}$ can be any point in time, but it can also correlate with the point in time $t_{kmax}$, which has been allocated to the maximum lambda deviation. The determination of the average cylinder-specific uneven running ER_CYL_mmv of the internal combustion engine can also be carried out in a preferred manner by taking a sliding mean.

A uneven running residue RES_ER_i of the internal combustion engine is determined for the relevant cylinders Z1 to Z8 in accordance with the calculation specification F17. In this case, M refers to the number of cylinders including the cylinder in which the combustion misfire MISF was detected during the processing of a step S4. M can for example correspond to the total number of cylinders Z1 to Z8 of the internal combustion engine. Thee calculation specification in accordance with F17 allows the deviation of the average cylinder-specific uneven running ER_CYL_mmv$_i$ of the cylinder in which the combustion misfire MISF was detected, referred by an average of any cylinder-specific uneven running of the internal combustion engine averaged over the number M−1 of the other cylinders to an uneven running threshold value THD_ER of said internal combustion engine. Therefore, as a result of this, a scaling takes place in a corresponding manner. The dependence of the uneven running threshold value THD_ER of the internal combustion engine on the point in time $t_{kcalc}$ then implicitly allows a dependence on the rotational speed N and/or a load variable can be given. However, the uneven running threshold value THD_ER of the internal combustion engine can also directly depend on the rotational speed N and/or a load variable. By the denominator of the calculation specification F17, a scaling of the numerator of the calculation specification F17 is guaranteed and indeed of the nature that the value zero of the uneven running residue RES_ER_i of the internal combustion engine corresponds to the desired behavior of the uneven running of said internal combustion engine, whereas in the case of values of perhaps one, already frequently occurring combustion misfires already take place. By means of this scaling, the influence of the load variables and the rotational speed N on the fourth residue RES_4 is clearly reduced.

The fourth residue RES_4 is determined by the multiplication of the specific uneven running residue RES_ER_i of the internal combustion engine with an uneven running weighting value F_ER, which in a preferred manner depends on the rotational speed N, the air mass flow MAF and the combustion misfiring rate MISFR, which has been allocated to the corresponding cylinders Z1 to Z8. The uneven running weighting value F_ER is for example given by the calculation specification F18, it being possible that C_ER refers to a predetermined basic weighting value.

By means of the ignition residue RES_spark' it is in particular possible in low load areas and/or in rotational speed areas to diagnose the cause of combustion misfires MISF in a reliable manner if they are to be allocated to the ignition system of the internal combustion engine. Based on FIGS. 9A to 9D, the signal curves are briefly explained below in the context of triggering a spark plug. At a point in time $t_0$, provision is made for switching off a charge current of an ignition coil of the spark plug 19 by triggering an IGBT (insulated gate bipolar transistor) to this end and this can be seen based on the curve of the IGN in FIG. 9a. As a result of a self-induction process of the ignition coil, an ignition voltage is subsequently built up on a secondary side. The voltage build-up takes place until the spark over is used at the spark gap of spark plug 19. VPRIM refers to the voltage of the primary side. VBAT refers to a supply voltage, in particular a battery voltage. $I_{spark}$ refers to a current on the secondary side. By means of self-induction of the ignition coil, the ignition voltage builds up on the secondary side. The voltage build-up takes place until the spark over across the spark gap of the spark plug is used. The current $I_{spark}$ flows on the secondary side up to the extinction of the spark at a point in time $t_1$. This passes through via the induction to an increased voltage on the primary side. The duration of the spark $t_{spark}$ is the point in time during which the voltage on the primary side exceeds a threshold value, for example, the supply voltage plus three volts. Information about the fulfillment of these conditions is made available by a signal IGN_DIAG of the control device 25. The signal IGN_DIAG is generated for all the spark plugs of all the cylinders Z1 to Z8 in a corresponding manner.

An average fluctuation in the duration of the spark delta_t_spark_mmv is determined by means of a calculation specification F20 (FIG. 8) and indeed in a preferred manner for all the internal combustion engines. Because a high deviation of the average fluctuation in the duration of the spark delta_t_spark_mmv of a cylinder from the mean value of the fluctuations of the average fluctuations in the duration of the spark delta t_spark_mmv is characteristic of an error of the ignition system, which has an effect on the one cylinder Z1 to Z8, a basic ignition residue RES_spark$_i$ is determined by means of a calculation specification F21. In principle, the determination of the basic ignition residue RES_spark$_i$ can occur independently from an occurrence of combustion misfires at any point in time $t_{kcalc}$, however it can for example correlate in time with the point in time $t_{kmax}$ to which the maximum lambda deviation has been allocated.

The ignition residue RES_spark' is determined according to the calculation specification F22. In this way, a value one is assigned to it if the basic ignition residue RES_spark is less than a predetermined threshold value of the duration of the spark THD$_{spark}$. The threshold value of the duration of the spark THD$_{spark}$ is determined in a preferred manner depending on the rotational speed N and/or on a mass air flow MAF and/or a coolant temperature TCO. On the other hand, it is determined from the quotients of the threshold value of the duration of the spark THD$_{spark}$ and the basic ignition residue RES_spark if the basic ignition residue RES_spark is greater than or equal to the threshold value of the duration of the spark THD$_{spark}$. In a preferred manner, the ignition residue RES_spark' is then taken into account multiplicatively when determining the total residue RES and indeed in a preferred manner in such a way that depending on the other residues RES_1 to RES_5 used, an intermediate value is determined and this is then multiplied with the ignition residue RES_SPARK'. By taking into account the coolant temperature when determining the threshold value of the duration of the spark THD$_{spark}$ it can be taken into account that the coolant temperature is representative of predetermined operating conditions for a temperature of the ignition coils, which then expresses itself in a changed combustion misfiring behavior in a slightly damaged spark coil.

The fifth residue RES_5 is determined depending on the air-to-fuel ratio LAMB_LS_DOWN$_j$ recorded by the second exhaust gas probe 43 downstream of the exhaust gas catalytic converter referring to the first group of cylinders Z1-Z4 and on the air-to-fuel ratio LAMB_LS_DOWN$_i$ recorded by the second exhaust gas probe 43' downstream of the exhaust gas catalytic converter referring to the second group of cylinders Z1-Z4 such as for example in accordance with the calculation specification F23. To this end, the time delay $\Delta t_{OSC}$ compared to the point in time $t_{kmax}$ is in each case taken into account in a preferred manner, which has been allocated to the maximum lambda deviation in the first exhaust gas probe 42. The fifth residue RES_5 compared to the second residue RES_2 has the advantage that on its calculation, continuously during the operation of the internal combustion engine, actual measured values have been made available, even in the transient operation of the internal combustion engine, in which the trim regulator is often deactivated and in this way the trim regulator intervention cannot change its value any further. Over and above this, the fifth residue RES_5 is then characterized by a high signal level swing.

The invention claimed is:

1. A method for detecting a combustion misfire of an internal combustion engine having a plurality of cylinders with a combustion chamber arranged in each cylinder where the cylinders have been allocated in at least two groups, each group having an exhaust gas tract with an exhaust gas catalytic converter and an exhaust gas probe arranged upstream of the exhaust gas catalytic converter, comprising:
   detecting the combustion misfire in one of the plurality of cylinders, depending on an operating variable of the internal combustion engine allocated to one group of the plurality of cylinders; and
   determining a cause of the combustion misfire that originates in an injection or in an ignition system of the internal combustion engine based on:
      a first standard difference of a lambda regulation that has been allocated to the plurality of cylinders and to the combustion misfire, and
      a second standard difference of a second lambda regulation, that has been allocated to one group of the plurality of cylinders and has not been allocated to the combustion misfires.

2. The method as claimed in claim 1, wherein the cause of the combustion misfire is determined based on:
   a first characteristic value that is based on a controller output of the lambda regulation that has been allocated to the plurality of cylinders and the combustion misfires, and
   a second characteristic value that is based depending on the controller output of the lambda regulation that has been allocated to one group of the cylinders but not to the combustion misfires.

3. A method for detecting a combustion misfire of an internal combustion engine having a plurality of cylinders where each cylinder has a combustion chamber where the misfire occurs, the plurality of cylinders having been allocated in at lease two groups, each group having an exhaust gas tract with an exhaust gas catalytic converter and an exhaust gas probe arranged upstream of the exhaust gas catalytic converter, comprising:
   detecting a combustion misfire in one of the plurality of cylinders, depending on an operating variable of the internal combustion engine allocated to one of the groups of the cylinders; and
   determining a cause of the combustion misfire that lies in an injection or in an ignition system of the internal combustion engine depending on:
      a first characteristic value determined based on a controller output of the lambda regulation that has been allocated to the plurality of cylinders and the combustion misfires, and
      a second characteristic value determined based on the controller output of the lambda regulation, that has been allocated to one group of the cylinders that has not been allocated to the combustion misfires.

4. The method as claimed in claim 3, wherein the first or the second characteristic value is representative of an integral part of the output controller of the lambda regulation.

5. The method as claimed in claim 4, wherein the first or the second characteristic value is determined based on a mean value of the controller output of the specific lambda regulation.

6. The method as claimed in claim 5, wherein the cause of the misfire is based on:
   a first trim characteristic value which depends on a trim regulator output that has been allocated to the group of cylinders and to the combustion misfires, and
   a second trim characteristic value which depends on a trim regulator output that has been allocated to the group of cylinders and has not been allocated to the combustion misfires.

7. The method as claimed in claim 6, wherein the cause of the misfire is based on the desired value for the air-to-fuel ratio, which has been allocated to the group of cylinders that have been allocated to the combustion misfires.

8. The method as claimed in claim 7, wherein the cause of the misfire is based on a cylinder-specific uneven running value of the internal combustion engine that has been allocated to the cylinder in which the combustion misfires that were detected and allocated to the other cylinders depending on additional cylinder-specific uneven running values.

9. The method as claimed in claim 8, wherein the cause of the misfire is based on:
   a cylinder-specific duration of the spark of a spark plug that has been allocated to the plurality of cylinders where the combustion misfire was detected, and
   an additional cylinder-specific duration of the spark of other spark plugs that have been allocated to other cylinders.

10. The method as claimed in claim 9, wherein the cause of the misfire is determined by evaluating a plurality of detected combustion misfires that have been allocated to the group of cylinders.

11. The method as claimed in claim 10, wherein the number of the majority of detected combustion misfires depends on a rotational speed or a load variable.

12. The method as claimed in claim 10, wherein a value of the majority of detected combustion misfires depends on a rotational speed and a load variable.

13. The method as claimed in claim 12, wherein the cause of the misfire is determined by evaluating the majority of detected combustion misfires that were detected during a predetermined point in time.

14. The method as claimed in claim 13, wherein the point in time depends on the rotational speed or the load variable.

15. The method as claimed in claim 13, wherein the point in time depends on the rotational speed and the load variable.

16. The method as claimed in claim 15, wherein the cause of the misfire is based on:
   a combustion misfiring rate of a specific cylinder that has been allocated to the plurality of cylinders and to which the combustion misfire has been allocated, or
   a probe ageing of the exhaust gas probe that has been allocated to the group of cylinders to which the combustion misfires have been allocated.

17. The method as claimed in claim 15, wherein the cause of the misfire is based on:
   a combustion misfiring rate of a specific cylinder that has been allocated to the plurality of cylinders and to which the combustion misfire has been allocated, and
   a probe ageing of the exhaust gas probe that has been allocated to the group of cylinders to which the combustion misfires have been allocated.

18. A device for detecting a combustion misfire in a combustion chamber of a cylinder of an internal combustion engine having a plurality of cylinders where the cylinders have been allocated in at least two groups, each group having an exhaust gas tract with an exhaust gas catalytic converter and an exhaust gas probe arranged upstream of the exhaust gas catalytic converter, comprising:

a misfire detector that detects the combustion misfire in one of the plurality of cylinders based on an operating variable of the internal combustion engine and allocated to one of the groups of the cylinders; and a controller that determines a cause of the combustion misfire that originates in an injection or in an ignition system of the internal combustion engine based on:

a first standard difference of a lambda regulation that has been allocated to the plurality of cylinders and to the combustion misfire, and a second standard difference of a second lambda regulation, that has been allocated to one group of the plurality of cylinders and has not been allocated to the combustion misfire.

* * * * *